United States Patent
Kasahara

(10) Patent No.: US 8,650,609 B2
(45) Date of Patent: Feb. 11, 2014

(54) IMAGE PROCESSING APPARATUS AND METHOD OF CONTROLLING THE SAME

(75) Inventor: Aya Kasahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 12/968,371

(22) Filed: Dec. 15, 2010

(65) Prior Publication Data

US 2011/0162037 A1   Jun. 30, 2011

(30) Foreign Application Priority Data

Dec. 25, 2009   (JP) .................................. 2009-296381

(51) Int. Cl.
*H04L 29/06*   (2006.01)

(52) U.S. Cl.
USPC ................................................. 726/1; 726/27

(58) Field of Classification Search
USPC ...................................................... 726/1, 27
See application file for complete search history.

(56) References Cited

U.S. PATENT DOCUMENTS

| | | | | | |
|---|---|---|---|---|---|
| 6,112,207 | A | * | 8/2000 | Nori et al. ............................. | 1/1 |
| 6,553,136 | B1 | * | 4/2003 | Keshet et al. .................. | 382/135 |
| 6,769,061 | B1 | * | 7/2004 | Ahern ........................... | 713/176 |
| 7,464,866 | B2 | * | 12/2008 | Mizoi ............................ | 235/381 |
| 7,893,966 | B2 | * | 2/2011 | Yoshida ...................... | 348/222.1 |
| 8,099,605 | B1 | * | 1/2012 | Billsrom et al. .............. | 713/187 |
| 8,239,956 | B2 | * | 8/2012 | Fukasawa ....................... | 726/26 |
| 8,271,119 | B2 | * | 9/2012 | Nakagawa .................... | 700/117 |
| 2002/0164026 | A1 | * | 11/2002 | Huima ........................... | 380/247 |
| 2003/0046268 | A1 | * | 3/2003 | Hirabayashi ...................... | 707/1 |
| 2003/0050893 | A1 | * | 3/2003 | Hirabayashi .................... | 705/52 |
| 2004/0125402 | A1 | * | 7/2004 | Kanai et al. .................. | 358/1.15 |
| 2004/0153452 | A1 | * | 8/2004 | Carro .................................. | 707/9 |
| 2005/0071663 | A1 | * | 3/2005 | Medvinsky et al. .......... | 713/200 |
| 2005/0071669 | A1 | * | 3/2005 | Medvinsky et al. .......... | 713/200 |
| 2005/0171914 | A1 | * | 8/2005 | Saitoh ............................ | 705/51 |
| 2005/0234859 | A1 | * | 10/2005 | Ebata ................................ | 707/1 |
| 2006/0177255 | A1 | * | 8/2006 | Mizoi ............................. | 400/62 |
| 2006/0279762 | A1 | * | 12/2006 | Onishi ......................... | 358/1.14 |
| 2007/0046969 | A1 | * | 3/2007 | Shinchi et al. ............... | 358/1.13 |
| 2007/0101420 | A1 | * | 5/2007 | Masui ............................. | 726/10 |
| 2007/0172281 | A1 | * | 7/2007 | Inoue et al. ..................... | 400/62 |
| 2007/0180265 | A1 | * | 8/2007 | Hiroshi ......................... | 713/187 |
| 2008/0002035 | A1 | * | 1/2008 | Yoshida ...................... | 348/222.1 |
| 2008/0007770 | A1 | * | 1/2008 | Tokunaga .................... | 358/1.15 |
| 2008/0106560 | A1 | * | 5/2008 | Shibusawa ..................... | 347/14 |
| 2008/0211924 | A1 | * | 9/2008 | Sugimori ................... | 348/222.1 |

(Continued)

FOREIGN PATENT DOCUMENTS

JP   2007-180873   7/2007

*Primary Examiner* — David García Cervetti
(74) *Attorney, Agent, or Firm* — Fitzpatrick, Cella, Harper & Scinto

(57) ABSTRACT

A conventional method of verifying alteration of an image file has a problem of security and may negatively affect user convenience. An image processing apparatus according to the present invention records, as an image file, input image data and a plurality of types of parameters input by the user, and stores, for each of parameter types classified in accordance with the features of the parameters, first security information based on the plurality of types of parameters. When reading out the image file, second security information is decided for each of parameter types based on the plurality of types of parameters included in the image file. If determined that the pieces of security information for any of the parameter types do not coincide, processing for the image file is changed in accordance with information to be used to restrict the processing to be executed for the image file.

7 Claims, 6 Drawing Sheets

(56) References Cited

U.S. PATENT DOCUMENTS

| | | | |
|---|---|---|---|
| 2008/0239350 A1* | 10/2008 | Ohira et al. | 358/1.9 |
| 2008/0240492 A1* | 10/2008 | Ohira et al. | 382/100 |
| 2008/0297821 A1* | 12/2008 | Shibao | 358/1.9 |
| 2009/0051956 A1* | 2/2009 | Kondo | 358/1.13 |
| 2009/0185223 A1* | 7/2009 | Kanai et al. | 358/1.15 |
| 2009/0210914 A1* | 8/2009 | Suzuki | 725/87 |
| 2009/0237725 A1* | 9/2009 | Hamaguchi | 358/1.15 |
| 2009/0292930 A1* | 11/2009 | Marano et al. | 713/189 |
| 2009/0316170 A1* | 12/2009 | Tsujii | 358/1.9 |
| 2010/0030707 A1* | 2/2010 | Jingu | 705/400 |
| 2010/0046029 A1* | 2/2010 | Suzuki et al. | 358/1.15 |
| 2010/0138653 A1* | 6/2010 | Spencer et al. | 713/167 |
| 2010/0332978 A1* | 12/2010 | Nakazawa | 715/273 |

* cited by examiner

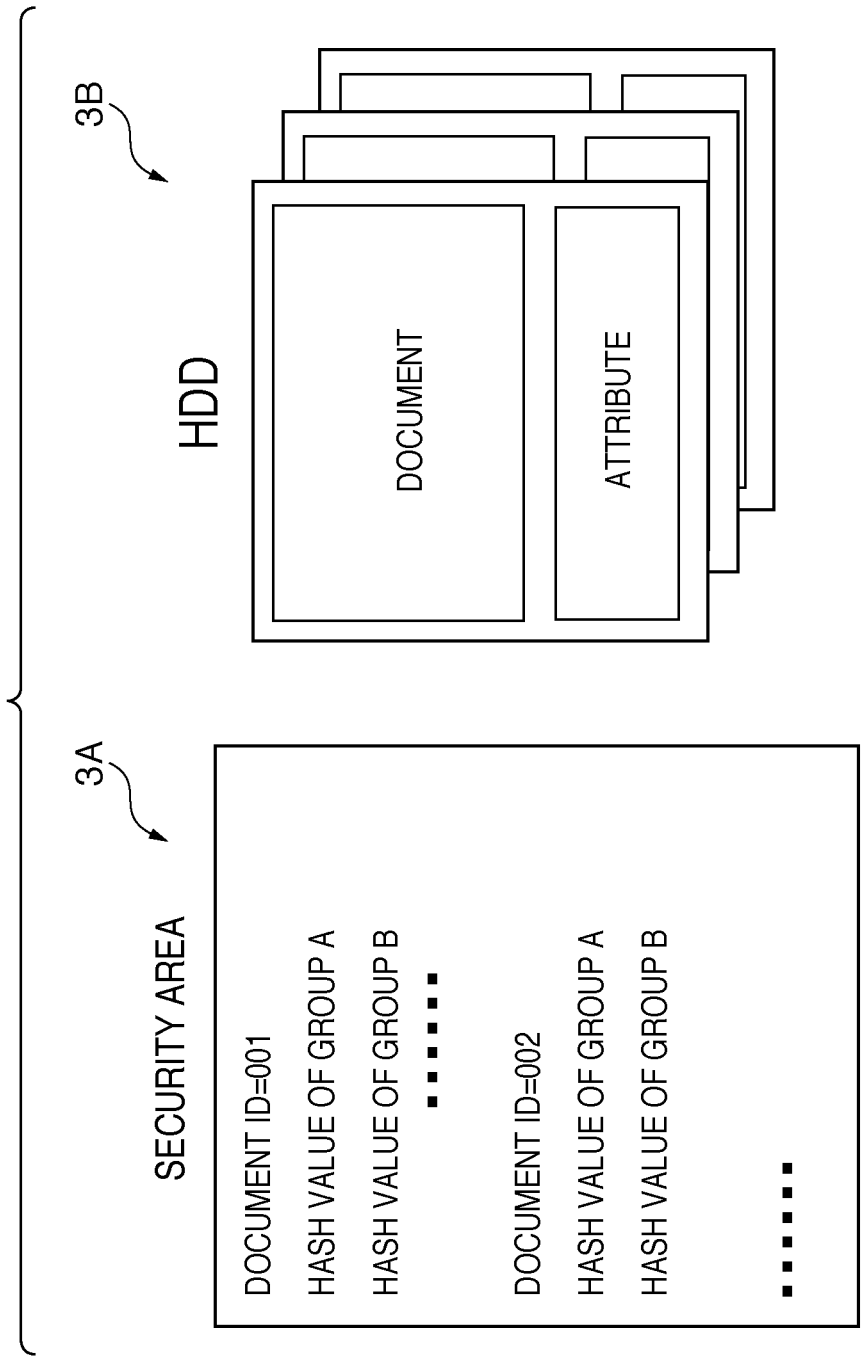

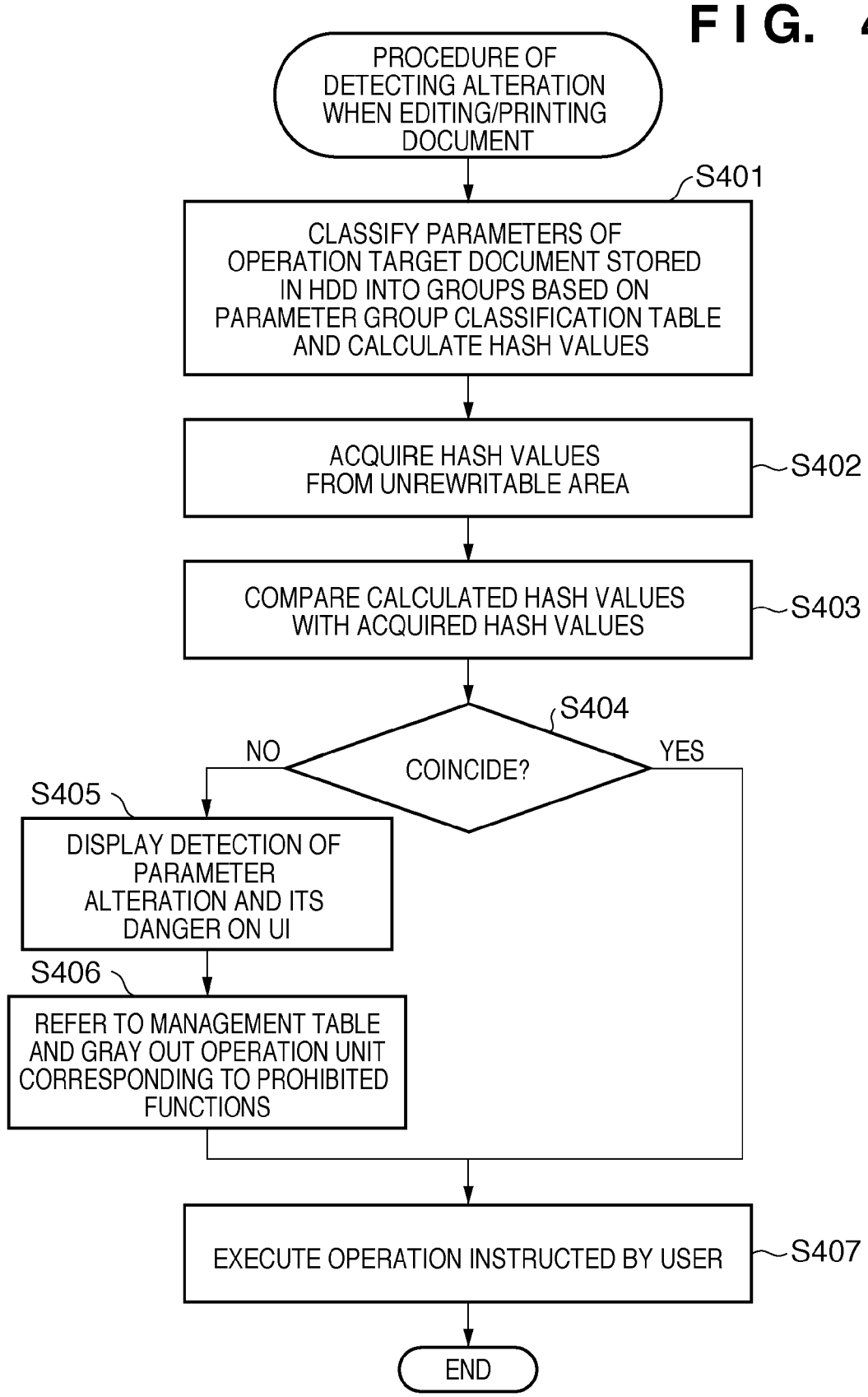

FIG. 5

| GROUP A | PARAMETERS TO BE USED IN IMAGE READING<br>EXAMPLES: DOCUMENT SIZE AND SCAN DENSITY |
|---|---|
| GROUP B | PARAMETERS TO BE USED IN IMAGE FORMATION<br>EXAMPLES: ENLARGEMENT/REDUCTION AND COLOR MODE |
| GROUP C | IMPORTANT PARAMETERS TO BE LEFT IN LOG<br>EXAMPLES: JOB SUBMITTER AND OPERATION DATE AND TIME |
| GROUP D | SETTINGS ASSOCIATED WITH SECURITY<br>EXAMPLES: COPY-FORGERY-INHIBITED PATTERN SETTING,<br>COPY NUMBER SETTING, AND SECURITY BARCODE SETTING |
| GROUP E | PARAMETERS ORIGINALLY SETTABLE IN USER ENVIRONMENT |

FIG. 6

| | CONTROL FOR ALTERED IMAGE FILE | | | |
|---|---|---|---|---|
| | PRINT | SEND TO FAX/PC | IMAGE FILE EDIT (PARAMETER RESETTING, IMAGE FILE MERGE, AND IMAGE FILE DELETION) | PREVIEW |
| GROUP A | ◯ | ◯ | ◯ | ◯ |
| GROUP B | △ | △ | △ | ◯ |
| GROUP C | × | × | × | ◯ |
| GROUP D | × | × | × | × |
| GROUP E | ORIGINAL SETTING | ORIGINAL SETTING | ORIGINAL SETTING | ORIGINAL SETTING |

◯ : ENABLE OPERATION AS USUAL

△ : ENABLE OPERATION ACCORDING TO USER'S DESIRE AFTER NOTIFYING HIM/HER OF ALTERATION AND ITS DANGER

× : PROHIBIT OPERATION

IMAGE PROCESSING APPARATUS AND METHOD OF CONTROLLING THE SAME

BACKGROUND OF THE INVENTION

1. Field of the Invention

The present invention relates to an image processing apparatus for creating an image file which stores image data and parameters to specify processes for the image data, and a method of controlling the same.

2. Description of the Related Art

In recent years, digitization of information is encouraging the use of digital images in various fields. Various kinds of additional information such as a creation date and time and parameters for image processing can be added to a digital image (a data set including the image data of a digital image and its additional information will be referred to as an "image file" hereinafter). On the other hand, problems concerning security of digital images have received a great deal of attention. A digital image has an advantage of being readily edited. However, this also means that alteration is easy. Data alteration is mainly made by malicious users. While there is assumed data alteration targeted at specific data, the target data for data alteration are not always predictable. For this reason, data alteration is considered an unknown threat.

If an image file is altered, its reliability cannot be guaranteed. For example, assume that an image file of high confidentiality stored in an image forming apparatus is altered in some way. In this case, if the user prints the image file or sends it to another PC or server without being aware of the alteration, incorrect information is circulated, potentially causing great danger. Hence, demand has arisen for a technique of detecting the alteration of an image file and performing appropriate control in accordance with the detection result.

Japanese Patent Laid-Open No. 2007-180873 discloses a technique of, when generating an image file, calculating a hash of image data included in the image file and additional information such as image capture parameters, operating the hash using a private key, and adding resultant information to part of the image file. When printing the image file, a hash is calculated in accordance with the same procedure as in generating the image file, and compared with the hash value added to the image file. If the values do not coincide, alteration is detected. If alteration is detected, control is performed to prohibit printing of the image file or to notify the user of the alteration and require him/her to determine whether or not to print the image file.

However, the method of Japanese Patent Laid-Open No. 2007-180873 is merely to control to, upon detecting alteration of an image file, prohibit printing of the image file or comply with the user's instruction. There is a problem of security because even a highly confidential document that should not be printed can be printed in accordance with a user's print instruction. Conversely, when printing is completely prohibited upon detecting alteration of an image file even if the altered portion poses no problem at all in printing, user convenience may be negatively affected.

SUMMARY OF THE INVENTION

The present invention has been made to solve the problems of the above-described prior art, and provides a technique of controlling processing for an image file in accordance with which of parameters stored in the image file has been altered.

One aspect of the present invention provides an image processing apparatus comprising: an image input unit that inputs image data; an accepting unit that accepts a plurality of types of parameters set by a user for the image data input by the image input unit; a storage unit that records, as an image file, the image data input by the image input unit and the plurality of types of parameters accepted by the accepting unit; a security information storage unit that, when recording the image file in the storage unit, stores, for each of parameter types classified in accordance with features of parameters, first security information based on the plurality of types of parameters corresponding to the image file; a decision unit that, when reading out the image file from the storage unit, decides, for each of the parameter types, second security information based on the plurality of types of parameters included in the image file; a determination unit that determines, for each of the parameter types, whether the first security information stored in the security information storage unit coincides with the second security information decided by the decision unit; a management information storage unit that stores, for each of the parameter types, management information to be used to restrict processing to be executed for the image file when the determination unit has determined that the pieces of security information do not coincide; and a control unit that changes the processing for the image file based on the parameter type for which the determination unit has determined that the pieces of security information do not coincide and the management information stored in the management information storage unit.

Another aspect of the present invention provides a method of controlling an image processing apparatus including a management information storage unit that stores, for each of parameter types, management information to be used to restrict processing to be executed for an image file including image data and a plurality of types of parameters set for the image data, comprising: inputting image data; accepting the plurality of types of parameters set by a user for the image data input in the inputting; recording the image data input in the inputting and the plurality of types of parameters accepted in the accepting in a first memory as the image file; when recording the image file in the first memory, storing in a second memory, for each of the parameter types classified in accordance with features of parameters, first security information based on the plurality of types of parameters corresponding to the image file; when reading out the image file from the first memory, deciding, for each of the parameter types, second security information based on the plurality of types of parameters included in the image file; determining, for each of the parameter types, whether the first security information stored in the second memory in the storing coincides with the second security information decided in the deciding; and changing the processing for the image file based on the parameter type for which it is determined in the determining that the pieces of security information do not coincide and the management information stored in the management information storage unit.

According to the present invention, processing for an image file is controlled in accordance with which of parameters stored in the image file has been altered. This enables more flexible processing as compared to the method of prohibiting all operations upon detecting alteration of a parameter.

Further features of the present invention will become apparent from the following description of exemplary embodiments (with reference to the attached drawings).

BRIEF DESCRIPTION OF THE DRAWINGS

FIG. 3 shows views of the data structure of a security area and an image file including a document and an attribute;

FIG. 4 is a flowchart for explaining the process of causing the image forming apparatus to detect alteration and notifying the user of it;

FIG. 5 is a view for explaining a parameter group classification table according to the embodiment; and FIG. 6 is a view for explaining a management table for security processing according to the embodiment.

DESCRIPTION OF THE EMBODIMENTS

The embodiment of the present invention will now be described in detail with reference to the accompanying drawings. Note that the embodiment to be described below does not limit the scope of claims of the present invention. All combinations of features described in the embodiment are not always essential to the solving means of the present invention.

Figure 1:
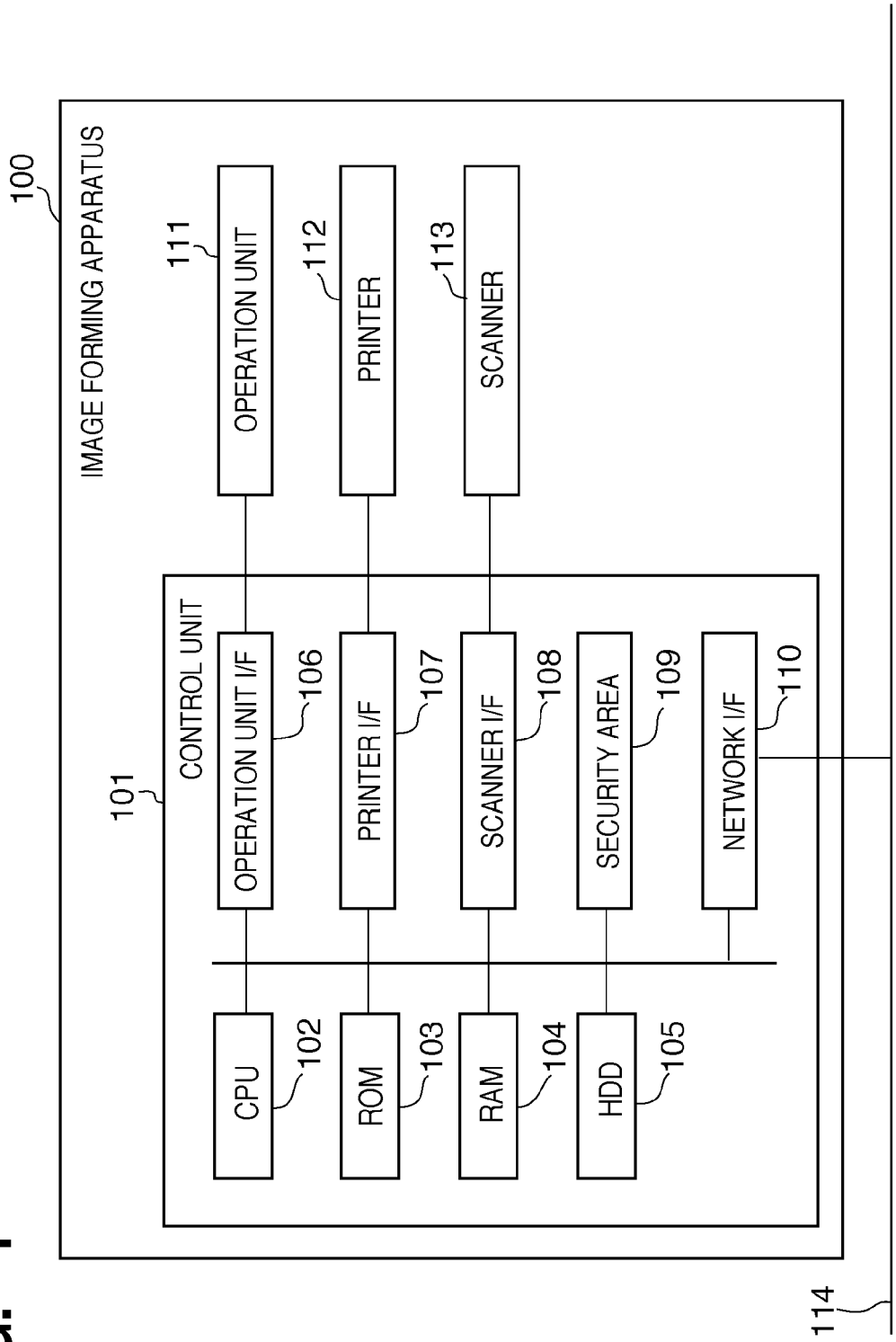
FIG. 1 is a block diagram for explaining the arrangement of an image forming apparatus according to the embodiment.

FIG. 1 is a block diagram for explaining the arrangement of an image forming apparatus 100 according to the embodiment. A control unit 101 including a CPU 102 controls the overall operation of the image forming apparatus 100. Based on a boot program stored in a ROM 103, the CPU 102 reads out programs stored in an HDD 105 (first memory) and loads them to a RAM 104. The RAM 104 is used as a temporary storage area such as the main memory or work area of the CPU 102. The HDD 105 stores image data, various programs, and various information tables to be described later. Control programs stored in the HDD 105 are expanded on the RAM 104 and executed by the CPU 102. An operation unit I/F 106 connects an operation unit 111 and the control unit 101. The operation unit 111 includes a liquid crystal display unit having a touch panel function, various keys, switches, and LEDs. A printer I/F 107 connects a printer 112 and the control unit 101. Image data to be printed by the printer 112 is transferred from the control unit 101 to the printer 112 via the printer I/F 107 and printed on a recording medium by the printer 112. A scanner I/F 108 connects a scanner 113 and the control unit 101. The scanner 113 generates image data by reading an image on an original and inputs the data to the control unit 101 via the scanner I/F 108. A security area 109 (second memory) is a storage area having tamper resistance. Special control is necessary for referring to or rewriting the security area 109. A network I/F 110 controls data exchange between the image forming apparatus 100 and a LAN 114 so as to transmit image data to an external device connected to the LAN 114 or receive various kinds of information from the external device connected to the LAN 114.

The process of causing the image forming apparatus of the embodiment to detect alteration of an image file stored in it and perform control according to the altered contents will be described next.

Figure 2:
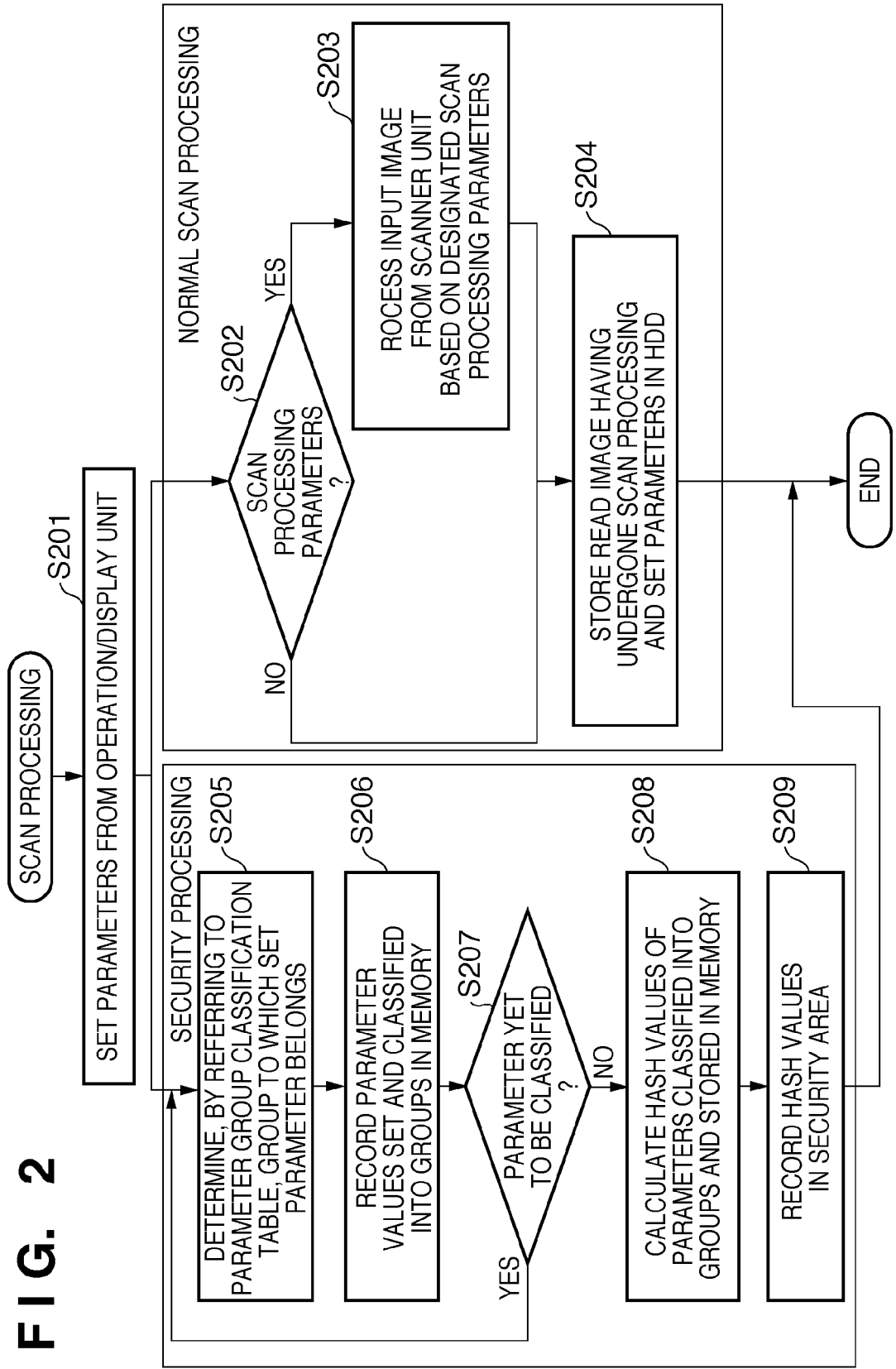
FIG. 2 is a flowchart for explaining processing of the image forming apparatus according to the embodiment.

The process of executing image input by storing image data read by the scanner 113 in the image forming apparatus 100 as an image file will be described first. FIG. 2 is a flowchart for explaining processing of the image forming apparatus 100 according to the embodiment. The control program to be used to execute this processing is installed in the HDD 105, loaded to the RAM 104 by the boot program in the ROM 103, and executed under the control of the CPU 102.

In step S201, the control unit 101 accepts setting parameters for image input, which are input from the operation unit 111 by the user, via the operation unit I/F 106. After receiving the setting parameters, the control unit 101 executes, in parallel, normal scan processing (S202 to S204) and security processing (S205 to S209).

Normal scan processing to be executed in steps S202 to S204 will be described. In step S202, the control unit 101 determines whether the setting parameters accepted in step S201 are scan processing parameters to be used in image reading. Scan processing parameters indicate both the parameters to be used by the scanner 113 to read an original and the parameters to be used by the control unit 101 to process an image input via the scanner I/F 108. Upon determining in step S202 that the setting parameters accepted in step S201 are not scan processing parameters, the process advances to step S204. On the other hand, if it is determined that the setting parameters are scan processing parameters, the process advances to step S203. In step S203, the control unit 101 sends a read instruction to the scanner 113 via the scanner I/F 108 so as to read image data based on the parameters set in step S201. When the image read by the scanner 113 is input to the control unit 101 via the scanner I/F 108, the control unit 101 also performs processing based on the setting parameters. The process then advances to step S204, and the control unit 101 stores the thus generated image data and the setting parameters input in step S201 in the HDD 105 as one image file.

Note that although an example has been described above in which the scanner 113 serving as an image input unit inputs read image data, the present invention is not limited to this. The present invention is also applicable to a case in which, for example, image data is input from another device on the LAN 114 via the network I/F 110.

Security processing to be executed in steps S205 to S209 in parallel to the scan processing in steps S202 to S204 will be explained next. The security processing uses a group classification table as shown in FIG. 5, which classifies, in accordance with processes for image data, a plurality of types of parameters to specify the processes for the image data.

An image file stored in the image forming apparatus 100 includes various setting parameters input from the operation unit 111. For example, when performing image formation, there exist not only the above-described scan processing parameters but also image processing setting parameters to be used in image printing. The image processing setting parameters to be used in image printing may be designated and stored simultaneously with storing an image file in the image forming apparatus 100 or newly reset after the storage. In addition to the parameters to be used for such image processing, parameters to be used to manage an image file also exist. The parameter group classification table in FIG. 5 classifies various types of parameters that can be contained in image files into a plurality of groups (groups A to E) in accordance with several viewpoints.

The group A indicates scan processing parameters to be used in image reading, and includes parameters such as the original size and the scan density. The group B indicates parameters to be used in image formation, and includes parameters, such as enlargement/reduction and the color mode, which are used to process an image at the time of image formation. The group C indicates important parameters to be left in a log, and includes the job submitter and the operation date and time. The group D indicates parameters concerning security, and includes parameters, such as copy-forgery-inhibited pattern setting, copy number setting, and security barcode setting, aiming at security or to be used to process an image. The group E includes parameters originally settable in the user environment. For example, in an ecology-oriented user environment that always requires 2-in-1 or monochrome printing using a small amount of toner, these parameters can arbitrarily be put into a group.

Security processing from step S205 in FIG. 2 will be described below based on the parameter group classification table in FIG. 5. In step S205, the control unit 101 reads out the parameter group classification table (FIG. 5) stored in the HDD 105, and determines the group to which a parameter set from the operation unit 111 belongs. The process advances to step S206, and the control unit 101 classifies the parameter set from the operation unit 111 via the operation unit I/F 106 to an appropriate group, and records (stores) the classified setting parameter in the RAM 104. The process advances to step S207, and the control unit 101 determines whether a parameter yet to be classified to a group exists among the parameters set in step S201. If a yet-to-be-classified parameter exists, the process returns to step S205 to repeat the process in steps S205 and S206. If no yet-to-be-classified parameter exists, the process advances to step S208. In step S208, the control unit 101 calculates, for each group, a hash (first security information) of the setting parameter values recorded in the RAM 104 in step S206. The process advances to step S209, and the control unit 101 records (stores) the hash values calculated in step S208 in the security area (security information storage unit) 109. At this time, the parameters are recorded in the security area 109 together and thus associated with the image file stored in the HDD 105 in step S204 so as to specify the image file.

As a result, the HDD 105 stores image files each including image data (document) generated by normal image storage processing and setting parameters (attributes), as indicated by 3B of FIG. 3. The security area 109 stores the hash value of parameters of each group by security processing, as indicated by 3A of FIG. 3. The security area 109 stores, for each document, hash values calculated for the respective groups of parameters classified in accordance with FIG. 5 together with a document ID.

Note that although two processes, that is, normal scan processing and security processing are executed in parallel in the flowchart of FIG. 2, the two processes may be executed sequentially.

The processing to be executed when the image forming apparatus 100 is requested by the user to execute processing for an image file stored in it will be described next. FIG. 4 is a flowchart for explaining the processing of causing the image forming apparatus 100 of the embodiment to detect alteration and notifying the user of it. The control program to be used to execute this processing is installed in the HDD 105, loaded to the RAM 104 by the boot program in the ROM 103, and executed under the control of the CPU 102. Note that this processing is executed by referring to a management table for security processing (management information storage unit) shown in FIG. 6, and FIG. 6 will be described first.

The image forming apparatus 100 can provide various functions to stored image files. Examples of the functions are printing, sending to PC/FAX, preview display, and image file edit (parameter resetting, merging to another image file, and image file deletion).

The management table for security processing shown in FIG. 6 represents whether, when a parameter included in a stored image file is altered, to restrict processing for the image file. When a setting parameter is altered, the image forming apparatus 100 determines, by referring to the parameter group classification table (FIG. 5), the group to which the parameter belongs, and decides the functions to be provided based on the management table for security processing shown in FIG. 6. A detailed example will be described below.

The group A includes parameters to be used in image reading, alteration of which poses no problem at all once the image file is stored in the HDD 105. For this reason, the image forming apparatus 100 permits all operations for an image file concerning the group A. The group B includes parameters to be used in image formation, alteration of which may yield a printed material not intended by the user who has stored the image file. Hence, concerning the group B, the image forming apparatus 100 controls to make the user check on it and perform an arbitrary operation. However, preview is freely usable after the user is notified of the alteration since it is used only for browsing and not associated with printing. The group C includes important parameters to be left in a log. If an altered image file is duplicated, the image file has an incorrect log from then on. Hence, if the parameters are altered, the image forming apparatus 100 controls to prohibit duplication of the image file. In this case as well, the preview function is freely usable after the user is notified of the alteration since it is used only for browsing without duplication. The group D includes settings associated with security, alteration of which makes it impossible to assure the security policy set by the user who has stored the image file. For this reason, the image forming apparatus 100 controls to completely prohibit operations of the image file. In the group E, parameters associated with the user environment operation policy are altered. In this case, the image forming apparatus 100 controls to, for example, allow operations according to the user environment policy or limit settable operations, thereby enabling the user to set an arbitrary mode.

If the parameters of the group E arbitrarily settable by the user overlap those of another predetermined group, the belonging group is decided based on the following priority order.

group D>group C>group E>group A=group B

A mere example has been described above, and the setting parameter group classification method or control for each group may be changed in accordance with the environment.

Alteration detection processing when editing/printing an image file will be described below with reference to FIG. 4 based on the above-described management table for security processing (FIG. 6).

An image file stored in the HDD 105 is assumed to be not only altered by a malicious user but also intentionally edited by a user in accordance with a normal path (procedure). The control unit 101 guarantees by the execution path of the control program or the like that the user intentionally edits the image file, and if the file is thus edited, controls to update the security information in the security area 109 as well. On the other hand, a malicious user can access the HDD 105 and alter the image file but not the information in the security area 109. It is therefore possible to detect unauthorized alteration of the image file using the information in the security area 109.

The control unit 101 first accepts a designation of an operation target image file from the user via the operation unit 111. In step S401, the control unit 101 reads out, from the HDD 105, the image file designated via the operation unit 111, and acquires the setting parameters of the image file. The control unit 101 classifies the acquired setting parameters into groups based on the parameter group classification table in FIG. 5, and calculates the hash (second security information) of each group. The process advances to step S402, and the control unit 101 acquires, from the security area 109, hash values recorded when storing the image file designated via the operation unit 111. In step S403, the control unit 101 determines, for each group, whether the hash value calculated in step S401 coincides with the hash value acquired from the security area 109 in step S402. Upon determining that the hash values coincide in all groups, the control unit 101 determines that the image file is not altered. The process then advances to step S407 to accept normal processing based on the user request.

On the other hand, upon determining in step S404 that the hash values do not coincide (in some group), the process advances to step S405. In step S405, the control unit 101 determines that the image file is altered, and warns the user of the danger of alteration by displaying it on the operation unit 111 via the operation unit I/F 106. The process then advances to step S406, and the control unit 101 refers to the parameter group classification table in FIG. 5 and the management table for security processing in FIG. 6. Based on the group of the parameter whose alteration is detected, the control unit 101 decides whether or not to permit processing of the image file. The control unit 101 instructs the operation unit 111 via the operation unit I/F 106 to gray out keys for operation instructions of the prohibited processing. The process advances to step S407, and the control unit 101 accepts processing designated from the operation unit 111. At this time, the operation unit 111 does not designate any dangerous function because of the control in step S406. Hence, the control unit 101 can directly execute the instruction from the operation unit 111.

As described above, according to the embodiment, the image forming apparatus can prevent outflow of dangerous image files. Though unaware of the fact, the user can use only safe functions for safe image files.

As another embodiment, the image forming apparatus 100 may control in the following way. The image forming apparatus 100 may perform display on the operation unit 111 such that the user can discriminate an altered image file. In accordance with altered contents, the image forming apparatus 100 may change the icon image representing the image file. In addition, when an altered image file is detected in the image forming apparatus, the image forming apparatus 100 may notify the administrator of it and prompt him/her to do maintenance of the image file.

An image forming apparatus including a printer and a scanner has been described above. However, the present invention is not limited to this, and is also applicable to, for example, an image processing apparatus which receives image data from an external device such as a scanner connected to a network and causes a printer device to print it via the network.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296381, filed Dec. 25, 2009, which is hereby incorporated by reference herein in its entirety.

What is claimed is:

1. An image processing apparatus comprising:
    a storage unit that stores an image file including image data and a plurality of types of parameters;
    a hash value storage unit that stores, for each of the parameter types classified in accordance with features of parameters, a first hash value obtained when the image file is stored in said storage unit based on the plurality of types of parameters included in the image file;
    a decision unit that, in a case where an operation for the image file stored in said storage unit is accepted from a user, decides, for each of the parameter types, a second hash value based on the plurality of types of parameters included in the image file;
    a determination unit that determines whether each of the plurality of types of parameters has been altered or not by comparing, for each of the parameter types, the first hash value stored in said hash value storage unit with the second hash value decided by said decision unit; and
    a control unit that permits or restricts processing for the image file in accordance with an operation accepted from the user, based on a parameter type for which said determination unit has determined that a type of parameter, of the plurality of types of parameters, has been altered.

2. The apparatus according to claim 1, further comprising a warning unit that warns the user when said determination unit has determined that any of the plurality of types of parameters has been altered.

3. The apparatus according to claim 1, wherein processing to be restricted for the image file includes at least one of printing, sending, editing, and preview display.

4. The apparatus according to claim 1, further comprising:
    a management information storage unit that stores, for each of the parameter types, management information to be used to restrict processing for the image file when said determination unit has determined that any of the plurality of types of parameters has been altered,
    wherein the control unit permits or restricts the processing for the image file by referring to the management information stored in the management information storage unit.

5. A method of controlling an image processing apparatus, the method comprising:
    storing an image file including image data and a plurality of types of parameters in a first memory;
    storing in a second memory, for each of the parameter types classified in accordance with features of parameters, a first hash value obtained when the image file is stored in the first memory based on the plurality of types of parameters included in the image file;
    in a case where an operation for the image file stored in the first memory is accepted from a user, deciding, for each of the parameter types, a second hash value based on the plurality of types of parameters included in the image file;
    determining whether each of the plurality of types of parameters has been altered or not by comparing, for each of the parameter types, the first hash value stored in the second memory with the second hash value decided in the deciding step; and
    permitting or restricting processing for the image file in accordance with the operation accepted from the user, based on a parameter type for which it is determined in the determining step that a type of parameter, of the plurality of types of parameters, has been altered.

6. The method according to claim 5, further comprising warning the user when it is determined in the determining step that any of the plurality of types of parameters has been altered.

7. The method according to claim 5, wherein processing to be restricted for the image file is at least one of printing, sending, editing, and preview display.

* * * * *